(12) United States Patent  
Pigg et al.

(10) Patent No.: US 12,433,796 B2  
(45) Date of Patent: Oct. 7, 2025

(54) WOUND DRESSING WITH ADHESIVE MARGIN

(71) Applicant: KCI USA, INC., San Antonio, TX (US)

(72) Inventors: William Pigg, Elvington (GB); Michelle Delbono, Earby (GB); Sally Stephens, Skipton (GB)

(73) Assignee: KCI USA, INC., San Antonio, TX (US)

( * ) Notice: Subject to any disclaimer, the term of this patent is extended or adjusted under 35 U.S.C. 154(b) by 995 days.

(21) Appl. No.: 17/468,964

(22) Filed: Sep. 8, 2021

(65) Prior Publication Data

US 2021/0401630 A1 Dec. 30, 2021

Related U.S. Application Data

(60) Division of application No. 15/659,486, filed on Jul. 25, 2017, now Pat. No. 11,141,318, which is a (Continued)

(30) Foreign Application Priority Data

Dec. 18, 2012 (GB) ..................................... 1222770

(51) Int. Cl.  
*A61F 13/02* (2024.01)  
*A61F 13/0203* (2024.01)  
(Continued)

(52) U.S. Cl.  
CPC ...... *A61F 13/0263* (2013.01); *A61F 13/0203* (2013.01); *A61F 13/0206* (2013.01); *A61F 13/0246* (2013.01); *A61F 13/0253* (2013.01); *A61F 13/0289* (2013.01); *A61F 13/15707* (2013.01); *A61F 13/025* (2013.01); *A61F 2013/15715* (2013.01)

(58) Field of Classification Search  
CPC .............. A61F 13/0263; A61F 13/0203; A61F 13/0289; A61F 13/15707; A61F 2013/15715  
See application file for complete search history.

(56) References Cited

U.S. PATENT DOCUMENTS

2011/0160686 A1* 6/2011 Ueda ................... A61F 13/0203  
156/60

FOREIGN PATENT DOCUMENTS

GB 2324732 A * 11/1998 ......... A61F 13/0203  
WO WO-2007113597 A2 * 10/2007 ......... A61F 13/0213

* cited by examiner

*Primary Examiner* — Daniel Mcnally (57) ABSTRACT

A wound dressing comprising: a backing sheet; a layer of pressure-sensitive adhesive on the backing sheet; an island of absorbent material having smaller area than the backing sheet and applied onto a central region of the backing sheet so as to leave a margin of adhesive-coated backing sheet around the absorbent material, and an apertured wound facing layer applied over the absorbent material and adhered to the backing sheet around said island by said pressure-sensitive adhesive, wherein the apertured wound facing layer comprises an apertured substrate having a coating of a silicone gel on the wound facing surface thereof, the open area of the apertured wound facing layer is from about 5% to about 75%, and the apertured wound facing layer comprises apertures having an open area of from about 2 mm2 to about 100 mm$^2$.

6 Claims, 5 Drawing Sheets

Related U.S. Application Data continuation of application No. 14/653,760, filed as application No. PCT/IB2013/060862 on Dec. 12, 2013, now Pat. No. 10,271,995.

(51) Int. Cl.
*A61F 13/0206* (2024.01)
*A61F 13/0246* (2024.01)
*A61F 13/15* (2006.01)

WOUND DRESSING WITH ADHESIVE MARGIN

CROSS-REFERENCE TO RELATED APPLICATIONS

This application is a divisional of U.S. patent application Ser. No. 15/659,486 filed on Jul. 25, 2017, entitled "Wound Dressing With Adhesive Margin" which is a continuation of U.S. patent application Ser. No. 14/653,760 filed on Jun. 18, 2015, entitled "Wound Dressing With Adhesive Margin" which claims the benefit of PCT Application No. PCT/IB2013/060862, filed on Dec. 12, 2013, entitled "Wound Dressing with Adhesive Margin", all of which are incorporated herein by reference in their entirety.

FIELD

The present invention relates to island-type wound dressings.

BACKGROUND

Island-type wound dressings comprise an absorbent region and an adhesive backing sheet covering the absorbent region and extending beyond the edges of the absorbent region to provide an adhesive margin around the absorbent region for attachment of the dressing to intact skin around the wound to be treated. The adhesive margin provides secure attachment of the dressing without the need for secondary dressings such as a bandage. The adhesive margin also reduces or prevents leakage of wound exudate from the edges of the dressing.

The adhesive used in such dressings is typically a medically acceptable pressure-sensitive adhesive (PSA) such as an acrylic-based PSA. Such adhesives provide a strong bond to skin, but as a result they are not readily repositionable, and they may cause skin irritation and/or discomfort when the dressing is removed. Moreover, the PSA is not normally permeable to oxygen or water vapour and therefore interferes with normal skin transpiration.

DETAILED DESCRIPTION

It is known to provide a discontinuous, e.g. patterned, layer of the PSA in order to address the above problems. However, application of a patterned layer of PSA increases the complexity of the manufacturing process and increases the risk of liquid leakage through the PSA to the edges of the dressing.

In a first aspect, the present invention provides a wound dressing comprising: a backing sheet; a layer of pressure-sensitive adhesive on the backing sheet; an island of absorbent material having smaller area than the backing sheet and applied onto a central region of the backing sheet so as to leave a margin of adhesive-coated backing sheet around the absorbent material, and an apertured wound facing layer applied over the absorbent material and adhered to the backing sheet around said island by said pressure-sensitive adhesive, wherein the apertured wound facing layer comprises an apertured substrate having a coating of a silicone elastomer on the wound facing surface thereof, the open area of the apertured wound facing layer is from about 5% to about 75%, and the apertured wound facing layer comprises apertures having an open area of from about 2 $mm^2$ to about 100 $mm^2$.

The adhesive-coated backing sheet may have any shape, such as square, rectangular, circular, oval, trapezium-shaped, suitably with rounded corners.

The adhesive-coated backing sheet supports the absorbent island and suitably provides a barrier to passage of microorganisms through the dressing. Suitably, the adhesive-coated backing sheet is substantially liquid-impermeable. The adhesive-coated backing sheet is suitably semipermeable. That is to say, the adhesive-coated backing sheet is suitably permeable to water vapour, but not permeable to liquid water or wound exudate. Suitably, the adhesive-coated backing sheet is also microorganism-impermeable. Suitable continuous conformable adhesive-coated backing sheets will suitably have a moisture vapor transmission rate (MVTR) of the backing sheet alone of 300 to 30000 $g/m^2/24$ hrs, suitably 1000 to 15000 $g/m^2/24$ hrs, and in one embodiment 1000 to 5000 $g/m^2/24$ hrs, at 37.5° C. at 100% to 10% relative humidity difference. The adhesive-coated backing sheet thickness is suitably in the range of 10 to 1000 micrometers, more suitably 100 to 500 micrometers.

Suitable polymers for forming the adhesive-coated backing sheet include polyurethanes and poly alkoxyalkyl acrylates and methacrylates such as those disclosed in GB-A-1280631. Suitably, the adhesive-coated backing sheet comprises a continuous layer of a high density blocked polyurethane foam that is predominantly closed-cell. A suitable adhesive-coated backing sheet material is the polyurethane film available under the Registered Trade Mark ESTANE 5714F. Also suitable are elastomeric polymeric esters such as Du Pont HYTREL (Registered Trade Mark).

The absorbent island may comprise any of the layers conventionally used for absorbing wound fluids, serum or blood in the wound healing art, including gauzes, nonwoven fabrics, superabsorbents, hydrogels and mixtures thereof. Suitably, the absorbent island comprises a layer of hydrophilic polyurethane foam on a wound facing side thereof, such as an open celled hydrophilic polyurethane foam prepared in accordance with EP-A-0541391. The absorbent island may further comprise a wicking layer. This may be a layer of a nonwoven fibrous web, for example a carded web of viscose staple fibers. The basis weight of the absorbent layer may suitably be in the range of 50-500 $g/m^2$, such as 100-400 $g/m^2$. The uncompressed thickness of the absorbent layer may be in the range of from 0.5 mm to 10 mm, such as 1 mm to 4 mm. The free (uncompressed) liquid absorbency measured for physiological saline may suitably be in the range of 5 to 30 g/g at 25° C.

The area of the absorbent island is suitably in the range of from 1 $cm^2$ to 400 $cm^2$, more suitably from 4 $cm^2$ to 200 $cm^2$, still more suitably from about 10 $cm^2$ to about 150 $cm^2$, for example from about 16 $cm^2$ to about 100 $cm^2$. Dressings of the latter size are especially suitable for the treatment of leg ulcers.

The island has a smaller area than the adhesive-coated backing sheet such that an adhesive-coated margin of the backing sheet extends around the island. Normally, the adhesive-coated margin extends around every edge of the absorbent island. Suitably, the adhesive-coated margin has a mean width of from 0.5 to 5 cm, suitably from 1 to 3 cm. The adhesive-coated margin may be made up of an inner margin covered by the apertured coated layer, and an outer margin extending outside the apertured coated layer, as explained further below.

The pressure-sensitive adhesive layer is suitably pressure-sensitive adhesive layer of the type conventionally used for island-type wound dressings. The PSA layer is suitably a continuous layer, but it may be apertured or interrupted in some embodiments. Acrylic-based pressure sensitive adhesives are suitable. In embodiments, a pressure sensitive adhesive based on acrylate ester copolymers, polyvinyl ethyl ether and polyurethane as described for example in GB-A-1280631. The basis weight of the PSA layer is suitably 20 to 250 g/m$^2$, and more suitably 50 to 150 g/m$^2$.

The apertured layer having a coating of silicone elastomer provides a weakly adherent 30 (tacky) or non-adherent wound facing layer over the absorbent layer. In addition, the apertured layer having a coating of silicone elastomer extends over at least part of the adhesive-coated margin. In this part of the margin, the apertured layer covers a portion of the PSA-coated surface of the backing sheet but allows adhesion of the pressure-sensitive adhesive through the apertures of the layer resulting in reduced overall adherency of the backing sheet in this part of the margin. The overlap of the apertured coated layer and the adhesive-coated backing sheet around the absorbent layer also serves to attach the apertured coated layer to the backing sheet thereby securing the 5 laminate. The silicone elastomer coating is suitably hydrophobic, whereby leakage of wound fluid through the edges of the dressing is inhibited. The silicone elastomer coating may be tacky or non-tacky.

The apertures in the apertured layer are suitably large enough to allow skin contact of the 10 backing layer PSA through the apertures when the dressing is applied to skin around a wound. Suitably, the said apertures have an open area of from about 4 mm$^2$ to about 50 mm$^2$, for example from about 5 mm$^2$ to about 30 mm$^2$. This refers to the average (mean) area of the apertures. Suitably, at least about 90% of the apertures in the apertured layer have open area in the specified ranges. Suitably, at least about 90%, for 15 example substantially all, of the apertures have substantially the same size and shape. Suitably, said apertures consist essentially of a regular array of apertures. The apertures may be of any shape, but suitably they are circular, oval, or polygonal. Suitably, the open area of the apertured layer is from about 10% to about 70% of the total area, for example from about 20% to about 50% of the total area, for example about 25% to about 20 40% of the total area. Suitably, the density of the apertures is from about 1000 to about 100,000 apertures per m$^2$, for example about 5000 to about 50,000 apertures per m$^2$.

Likewise, in order to ensure sufficient adherency of the PSA through the apertures of the apertured layer, the apertured layer is suitably thin. In embodiments, the thickness of the 25 apertured wound facing layer is less than about 1 mm, for example from about 0.02 mm to about 0.5 mm, in embodiments from about 0.05 mm to about 0.2 mm. The term "thickness" in this context refers to the combined thickness of the silicone coating and substrate.

The apertured substrate may be any medically acceptable apertured sheet material, including textile materials such as gauzes. Suitably, the apertured substrate is a unitary substrate such as a unitary polymer mesh or an apertured polymer film. Suitable polymer materials include polyethylene, polypropylene, polyester, polyvinyl acetate, and ethylene vinyl acetate. Suitably, the film substrate has a thickness of from about 1 micrometer to about 100 micrometers for example from about 5 micrometers to about 25 micrometers. In other embodiments the substrate is a woven or nonwoven textile material, typically having an uncompressed thickness of from about 0.1 mm to about 1 mm.

In embodiments, the apertured wound facing layer is smaller than the adhesive-coated backing sheet, whereby an adhesive-coated margin of the backing sheet extends around the apertured wound facing layer. This continuous PSA margin provides additional security of attachment and leak resistance around the edges of the dressing. However, it 10 can be made narrower than the PSA-coated margin of conventional island dressings because of the adherency of the inner margin covered by the apertured layer. Thus, in embodiments, the margin of PSA-coated backing sheet around the absorbent island that is covered by the apertured layer has a mean width of from about 5 mm to about 30 mm, for example from about 10 mm to about 20 mm. The outer margin of PSA-coated 15 backing sheet only (where present) has a mean width of from about 2 mm to about 20 mm, for example from about 5 mm to about 15 mm, typically about 10 mm.

In embodiments, the apertured wound facing material comprises lines of weakness substantially parallel to, and spaced from, one or more edges of the apertured wound 20 facing material. These lines of weakness define tear-off strips along one or more edges of the apertured wound facing material that allow the size of the apertured wound facing material (and hence the width of the PSA-coated margin around the outside of the apertured wound facing material) to be varied according to the clinical requirements. Thus, for a heavily-exuding wound, a wider PSA-coated margin around the edges of the 25 dressing may be desirable. On the other hand, for lightly exuding wounds, or where easy repositioning of the dressing is desirable, little or no PSA-coated margin around the outside of the apertured wound facing material may be preferable. Thus, in some embodiments the apertured wound facing sheet may be coterminous with the PSA-coated backing sheet prior to removal of any of the tear strips so that there is no 30 continuously PSA-coated margin around the apertured wound facing sheet until removal of the tear strips.

The lines of weakness may, for example comprise lines of perforations or score lines. Suitably, one or more lines of weakness defining tear-off strips are defined in all edges of the apertured wound facing material so as to allow uniform increasing of the PSA-coated margin. Suitably, the width of the tear-off strips (i.e. the average spacing of the 5 lines of weakness from the edges of the apertured sheet is from about 5 mm to about 20 mm, for example about 8 mm to about 15 mm. Suitably, a pull tab is attached to, or formed integrally with, each tear strip defined by the lines of weakness to assist removal of the tear strip. Suitably, a release coating such as a silicone or a fluoropolymer coating may be provided on the underside of the tear-off strips of the apertured wound 10 contacting layer to assist removal of the strips.

The silicone coating on the wound facing side of the apertured layer is suitably a hydrophobic, tacky or non-tacky silicone polymer. The silicone elastomer coating is suitably coated only on the wound facing side of the apertured layer.

The total coating weight of the silicone is suitably from about 15 g/m$^2$ to about 500 g/m$^2$, for example from about 40 g/m$^2$ to about 250 g/m$^2$, typically from about 50 g/m$^2$ to about 150 g/m$^2$. The silicone is suitably a soft skin adhesive silicone composition. Suitable chemistry is described below. The silicone is suitably hydrophobic.

Suitably, the silicone composition is a so-called soft skin adhesive silicone elastomer. Such silicones can be made by an addition reaction (hydrosilylation) between (a) a vinyl functional polydimethyl siloxane, such as bis-dimethyl vinyl poly dimethyl siloxane (PDMS), and (b) a hydrogen functional siloxane, such as dimethyl, methylhydrogen 25 siloxane copolymers, hydrogen dimethylsiloxy terminated PDMS. The cure reaction is catalyzed by a hydrosilylation catalyst, such as a noble metal catalyst, suitably a platinum catalyst. A silicone prepolymer composition may further comprise a polymerization inhibitor that is evaporated from said composition during said step of thermally partially curing, for example 2-methyl-3-butyn-2-ol. Where present, the polymerization inhibitor is suitably present in an amount of from about 0.001 wt. % to about 1 wt. %, for example from about 0.01 wt. % to about 0.1 wt. % before curing. Alternatively, no polymerisation inhibitor is present in the silicone compositions.

Silicone skin adhesive compositions are suitably supplied as two-part systems: Part A contains at least the vinyl prepolymer and the catalyst, while Part B contains the vinyl prepolymer and the SiH siloxane cross linker. The components are mixed immediately before use, optionally with addition of a polymerization inhibitor.

In embodiments, the silicone coating composition comprises or consists essentially of the following components:
- (A) a diorganopolysiloxane having at least 2 alkenyl groups in each molecule;
- (B) an organohydrogenpolysiloxane having at least 2 silicon-bonded hydrogen atoms in each molecule, in a quantity sufficient for the ratio between the number of moles of silicon-bonded hydrogen atoms in this component and the number of moles of alkenyl groups in component (A) to have a value of from about 0.6:1 to about 20:1,
- (C) optionally a platinum group metal catalyst suitably in a quantity providing 0.1 to 500 weight parts as platinum group metal per 1,000,000 weight parts component (A);
- (D) optionally, a volatile polymerization inhibitor, suitably selected from: alkyne alcohols such as 2-methyl-3-butyn-2-ol, 3,5-dimethyl-1-hexyn-3-ol, and phenyl-butynol; ene-yne compounds such as 3-methyl-3-penten-1-yne and 3,5-dimethyl-3-hexen-1-yne; tetramethyltetrahexenyl-cyclotetrasiloxane; and benzotriazole.

The diorganopolysiloxane, component (A), used in the instant invention is the base component of the total composition. This diorganopolysiloxane must contain at least 2 alkenyl groups in each molecule in order for this composition to cure into a rubbery elastic silicone rubber coating composition.

The diorganopolysiloxane (A) comprises essentially straight-chain organopolysiloxane with the average unit formula $R_nSiO(4-n)/2$, wherein R is selected from substituted and unsubstituted monovalent hydrocarbon groups and n has a value of 1.9 to 2.1. R may be exemplified by alkyl groups such as methyl, ethyl, propyl, and others; alkenyl groups such as vinyl, allyl, and others; aryl groups such as phenyl, and others; and haloalkyl groups such as 3,3,3-trifluoropropyl and others. The diorganopolysiloxane (A) should have a viscosity at 25° C. of at least 100 centipoise (1 d Pa·s). When such factors as the strength of the silicone rubber coating membrane, and blendability are taken into account, the viscosity of diorganopolysiloxane (A) at 25° C. is preferably from 1,000 centipoise (1 Pa·s) to 100,000 centipoise (100 Pa·s). The diorganopolysiloxane (A) may be exemplified by dimethylvinylsiloxy-endblocked dimethylpolysiloxanes, dimethylvinylsiloxy-endblocked dimethylsiloxane-methylvinylsiloxane copolymers, and dimethylvinyl-siloxy-endblocked dimethyl siloxane-methylphenylsiloxane copolymers.

Component (B), an organopolysiloxane that contains at least 2 silicon-bonded hydrogen atoms in each molecule, is a crosslinker for the composition of the instant invention. The organopolysiloxane (B) may be exemplified by trimethylsiloxy-endblocked methyl hydrogenpolysiloxanes, trimethylsiloxy-endblocked dimethyl siloxanemethylhydrogen-siloxane copolymers, dimethylphenylsiloxy-endblocked methylphenylsiloxanemethyl-hydrogensiloxane copolymers, cyclic methylhydrogenpolysiloxanes, and copolymers that contain the dimethylhydrogensiloxy unit and SiO4/2 unit. The organohydrogenpolysiloxane (B) should be added in a quantity that the ratio between the number of moles of silicon-bonded hydrogen atoms in this organohydrogenpoly siloxane and the number of moles of alkenyl groups in component (A) has a value of 0.6:1 to 20:1.

The platinum group metal catalyst, component (C), used in the compositions is a curing catalyst. The platinum group metal catalyst (C) may be exemplified by platinum micropowder, platinum black, chloroplatinic acid, platinum tetrachloride, olefin complexes of chloroplatinic acid, alcohol solutions of chloroplatinic acid, complexes between chloroplatinic acid and alkenylsiloxanes, rhodium compounds, and palladium compounds. The platinum group metal catalyst (C) should be added generally at 0.1 to 500 weight parts as platinum group metal per 1,000,000 weight parts component (A), and is preferably used at 1 to 50 weight parts as platinum group metal per 1,000,000 weight parts component (A). The reaction will not develop adequately at less than 0.1 weight parts, while additions in excess of 500 weight parts are uneconomical.

The coated substrate is then subjected to thermal curing to at least partially cure the silicone. The thermal curing is suitably performed continuously by passing the coated substrate through an oven. Suitable thermal curing conditions include exposure to a temperature of from about 80° C. to about 200° C., for example about 120° C. to about 180° C. for a time of from about 1 minute to about 10 minutes, for example about 1.5 minutes to about 5 minutes. The elevated temperature results in evaporation of any polymerization inhibitor from the silicone composition and therefore promotes polymerization of the silicone. The resulting material is chemically polymerized, but may be capable of further curing by ionizing radiation for example during sterilization.

The adhesive dressing according to the present invention may further comprise at least one removable cover sheet to cover the absorbent island and the adhesive-coated margin(s) around the absorbent island. The cover sheet covers and protects the absorbent island and prevents premature adhesion of the adhesive layer. The cover sheet is removed by the care giver immediately before application of the dressing.

The cover sheet may comprise a film of polyethylene, polypropylene or fluorocarbons and papers coated with these materials. Suitably, the cover sheet is a release-coated paper sheet, such as a silicone release-coated paper sheet. Examples of silicone-coated release papers are POLYSLIK (Registered Trade Mark) supplied by H P. Smith & Co., offered in various formulations to control the degree of adhesion of the paper to the adhesive surface.

Suitably, the dressing comprises a first removable cover sheet having a first edge and a second removable cover sheet that meets the first cover sheet along the first edge.

Certain suitable dressings have a central cover sheet with first and second opposed edges, and two side cover sheets that meet the central cover sheet along the opposed edges. Suitably, the opposed edges are substantially parallel. This arrangement of three cover sheets is especially suitable for positioning of relatively large dressings, such as sacral dressings, as described in detail in EP-A-0117632.

Suitably, along each of said edges where the cover sheets meet, one of the cover sheets is folded back to provide a folded-back margin, and the other cover sheet overlaps the said folded-back margin. This provides an easy-to-grasp margin on each cover sheet in the region of overlap to assist removal of the cover sheets by the care giver.

In the case of the embodiment comprising three cover sheets described above, each side cover sheet is suitably folded back along each of said edges where the cover sheets meet to provide a folded-back margin, and the central cover sheet overlaps the said folded-back margin, suitably as described in EP-A-0117632.

Suitably the dressing according to the present invention is sterile and packaged in a microorganism-impermeable container.

The dressing of the invention may be made by conventional cutting and lamination of 10 the various layers. The apertured coated top sheet may be made by coating a suitable film substrate with a fluid silicone precursor mixture as described above, followed by thermal curing as described above. The coating may be done by any conventional means, such as by roller, doctor blade, spraying or dipping. In embodiments, the fluid silicone precursor may be coated onto an already-apertured substrate, in which case the 15 coated substrate is suitably passed over an air blower to blow excess precursor out of the apertures as described for example in WO-A-9319709.

In other embodiments, the film substrate may be apertured, for example by die cutting, for example after the coating and curing steps. In a particularly suitably embodiment, 20 the die cutting is performed after curing of a layer of the silicone sandwiched between the support film and a release sheet.

Accordingly, in a further aspect the present invention provides a method of making a wound dressing as described herein comprising the steps of: forming a precursor 25 laminate comprising a layer of silicone sandwiched between a polymeric film support sheet and a release sheet; die cutting aperture perimeters through the polymeric film support sheet and the silicone layer; and removing the release sheet to leave an apertured wound facing layer comprising an apertured polymeric film having a coating of a silicone gel on the wound facing surface thereof.

In a further aspect the present invention provides a method of making a wound dressing as described herein comprising the steps of: forming a precursor laminate comprising a layer of silicone sandwiched between a polymeric film support sheet and a release sheet, wherein said precursor laminate is formed by disposing a layer of a fluid silicone 10 prepolymer on said release sheet, curing said fluid silicone prepolymer, and disposing said polymeric film support sheet on the silicone layer; die cutting aperture perimeters through the polymeric film support sheet and the silicone layer; and removing the release sheet to leave an apertured wound facing layer comprising an apertured polymeric film having a coating of a silicone gel on the wound facing surface thereof.

Suitably, the method according to the present invention further comprises one or more of the following steps: coating one surface of a backing sheet with a layer of pressure sensitive adhesive; applying an island of absorbent material to a central region of the adhesive-coated surface of the backing sheet, wherein the absorbent material has a 20 smaller area than the backing sheet so as to leave an adhesive-coated margin of the backing sheet around the island; and applying said apertured wound facing layer over said island with said polymeric film support sheet facing the backing sheet, wherein a margin of said wound contacting laminate is adhered to said adhesive-coated margin around said island.

Suitably, the method further comprises the step of packaging the dressing in a microorganism-impermeable container, and sterilizing the dressing. Sterilization may be, and preferably is, effected using an ethylene oxide (EtO) sterilization process, which is known in the art for sterilization of medical and pharmaceutical products that cannot 30 support conventional high temperature steam sterilization. In a typical process, gaseous EtO is mixed with air at a ratio of at least 3% EtO and infiltrates the dressing to kill any microorganisms remaining from the production process. Most EtO sterilization processes involve a pre-conditioning stage, a sterilization stage and a degassing stage.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Referring to FIGS. 1 to 4, the wound dressing 1 according to the invention comprises a conventional backing sheet 2 of microporous, semipermeable polyurethane. The backing sheet 2 is coated on its wound-facing surface with a continuous layer 4 of medically acceptable acrylic pressure-sensitive adhesive. An absorbent island is located in the central region of the wound-facing surface of the backing sheet 2 so as to leave an adhesive-coated margin of the backing sheet 2 around the island. The absorbent island is made up of a nonwoven textile absorbent/wicking layer 6 and a polyurethane foam wound facing layer 8. Each of these layers is 1-2 mm thick in the dry uncompressed state, i.e. before use. The absorbent/wicking layer 6 is formed of viscose fibers optionally mixed with gel-forming fibers or other superabsorbents. The polyurethane 5 foam layer is formed of a hydrophilic polyurethane foam available from Systagenix Wound Management Ltd. under the Registered Trade Mark TIELLE. It is produced as described in EP-A-0541391.

The dressing 1 further comprises an apertured wound-facing top sheet 10 that covers the absorbent island and extends around the edges of the absorbent island so that it adheres to the margins of the adhesive-coated backing sheet around the absorbent island. The top sheet 10 is smaller than the backing sheet 2, whereby a relatively narrow adhesive-coated margin 12 of the backing sheet extends around all edges of the top sheet 10.

Figure 1:
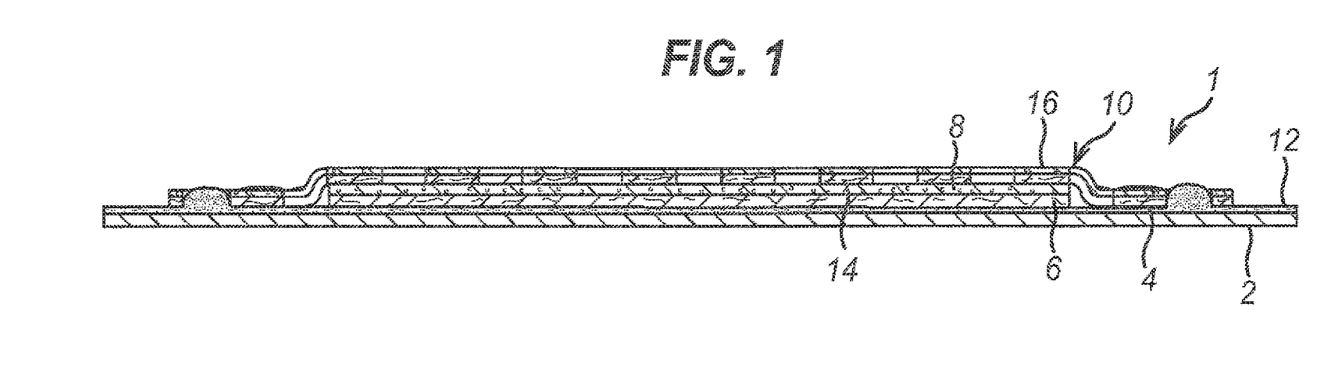
FIG. 1 shows a longitudinal cross-section through a dressing according to the invention.
Figure 2:
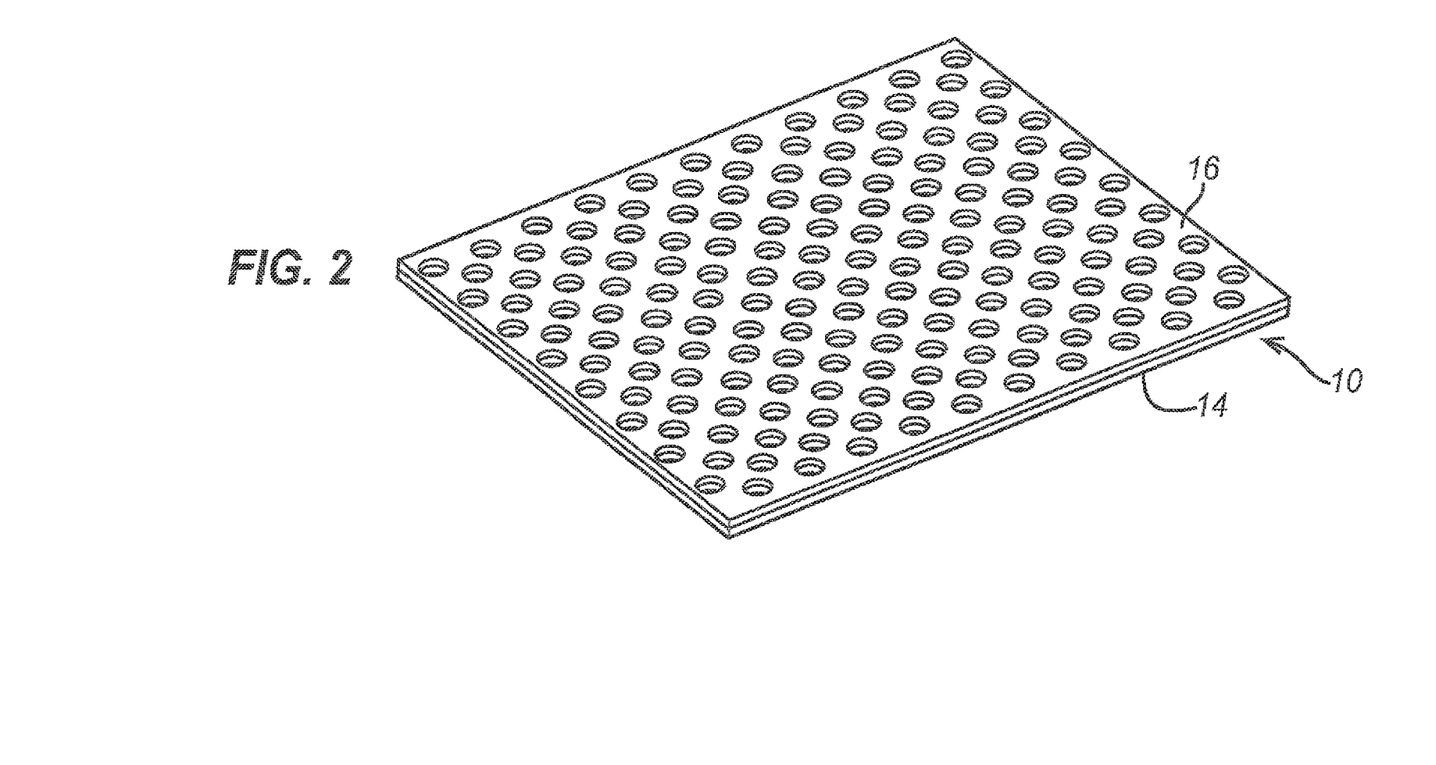
FIG. 2 shows a perspective view of the apertured top sheet of the dressing of FIG. 1.

The top sheet 10 is formed from an apertured film substrate 14 coated on its wound facing surface with a layer of silicone elastomer 16. The film substrate is formed of polyurethane, has thickness about 10 micrometers. The circular apertures of diameter 6 mm are arranged in a regular array at 10,000 apertures per $m^2$ such that the open area of the film substrate is about 28%. The thickness/coating weight of the silicone is about 50 $g/m^2$.

The resulting overall thickness of the top sheet is about 80 micrometers. The relatively large aperture size and low thickness of the top sheet 10 enable pressure-sensitive adhesive from the layer 4 to penetrate through the apertures and adhere to skin located below the top sheet 10. The degree of adherency can be controlled by varying the tackiness of the silicone elastomer, the size of the apertures, and the overall open area of the top sheet, thereby allowing optimization of adherency for leak prevention and secure attachment versus ease of removal and repositionability. In this embodiment, the additional narrow adhesive margin 16 around the top sheet is provided for further leak prevention from the dressing. In other embodiments, the top sheet may be coterminous with the backing sheet so that there is no narrow adhesive margin 16.

Figure 3:
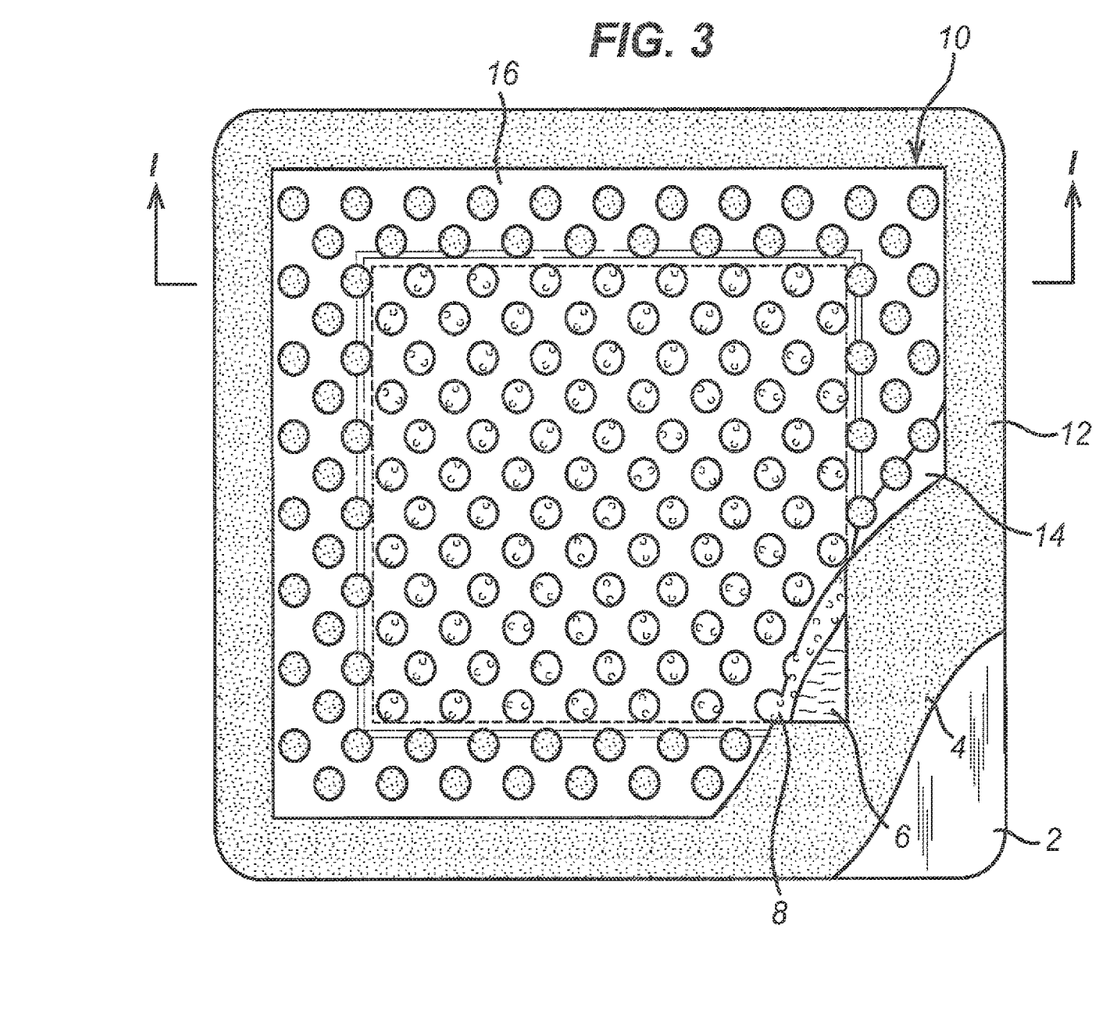
FIG. 3 shows a bottom perspective view of a dressing according to FIG. 1, partially cut away to show detail.

Referring to FIG. 3, release-coated cover sheets 20, 22 are positioned over the wound facing side of the dressing. Inside edges 24, 26 of the cover sheets 20, 22 are folded over to provide for easy removal of the cover sheets before application of the dressing.

Figure 4:
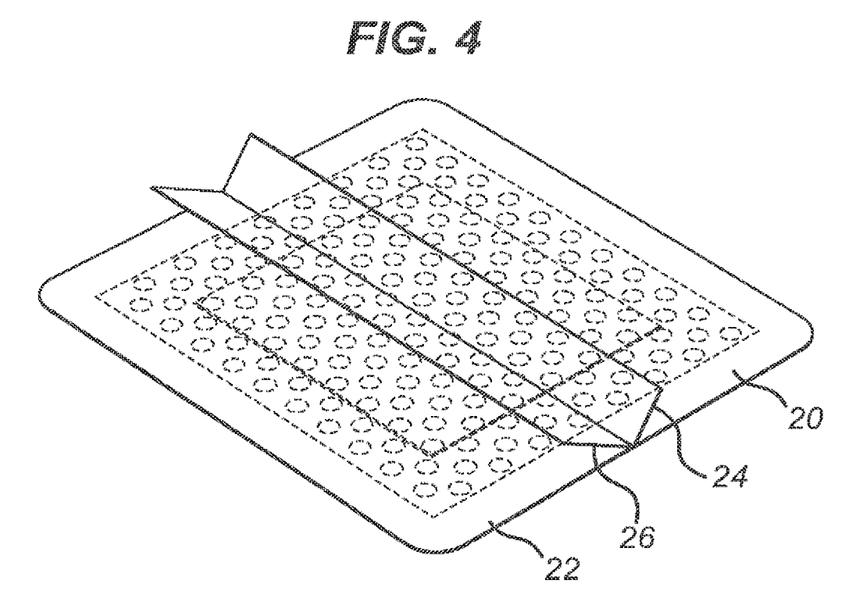
FIG. 4 shows a bottom perspective view of a dressing according to FIG. 1 further comprising a cover sheet.

Referring to FIG. 4, the wound dressing of FIG. 3 is shown sterile and packaged in a microorganism-impermeable envelope 30 having a transparent window 32.

Figure 5:
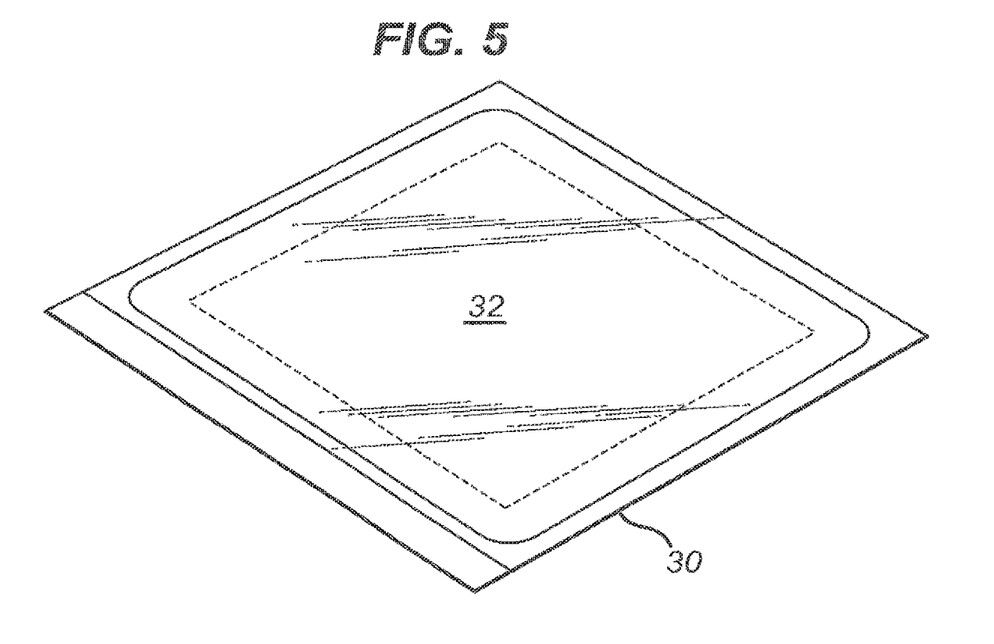
FIG. 5 shows the dressing of FIG. 3 enclosed in a microorganism-impermeable pouch.

Referring to FIG. 5, this embodiment 40 of the apertured wound facing sheet consists of an apertured polymer film substrate layer 42 and silicone coating layer 44 as described above in relation to the first embodiment. Lines of perforations 45, 46, 47, 48 are formed in the film substrate layer 42 parallel to the four edges of the wound facing sheet, to define respective tear strips along each edge. Respective pull tabs 51, 52, 53, 54 are 10 formed integrally with the film substrate layer for removal of the tear strips. A release coating of non-adherent silicone or fluoropolymer may be provided on the surface of the tear strips opposite the silicone-coated wound facing surface to assist removal of the tear strips in use, as described below.

Figure 6:
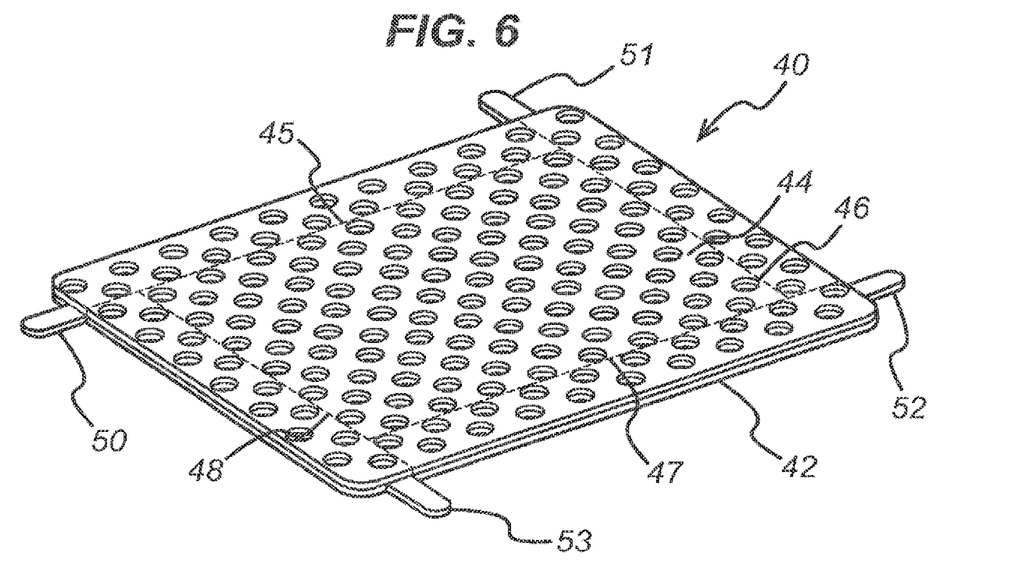
FIG. 6 shows a perspective view of an apertured top sheet incorporating tear strips.
Figure 7:
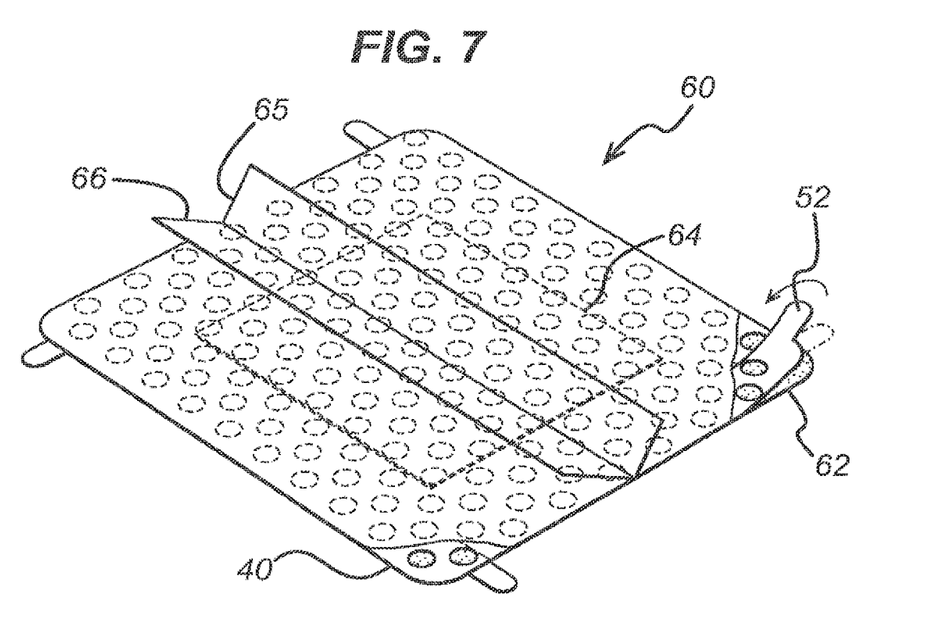
FIG. 7 shows a bottom perspective view of a dressing according to a second embodiment of the present invention, incorporating the apertured top sheet of FIG. 6.

Referring to FIG. 6, the wound dressing 60 according to this embodiment comprises a PSA coated backing sheet 62, and absorbent island 64, and release-coated cover sheets 65, 66 as described above in relation to the first embodiment. The apertured wound facing sheet 40 as shown in FIG. 5 completely covers the backing sheet 62. The dressing may be used in this configuration by removing the cover sheets 65, 66 and applying the 20 dressing around a wound. The PSA-coated margin of the backing sheet 62 is completely covered by the apertured wound facing sheet, whereby the overall adherence of the margin is reduced to allow easy removal and/or repositioning of the dressing. For wounds requiring stronger adherency, the tear strips on the apertured wound facing layer may be removed by pulling on the tabs 50, 51, 52, 53 to expose a margin of the PSA 25 coated backing sheet extending around the apertured wound facing sheet.

Figure 8:
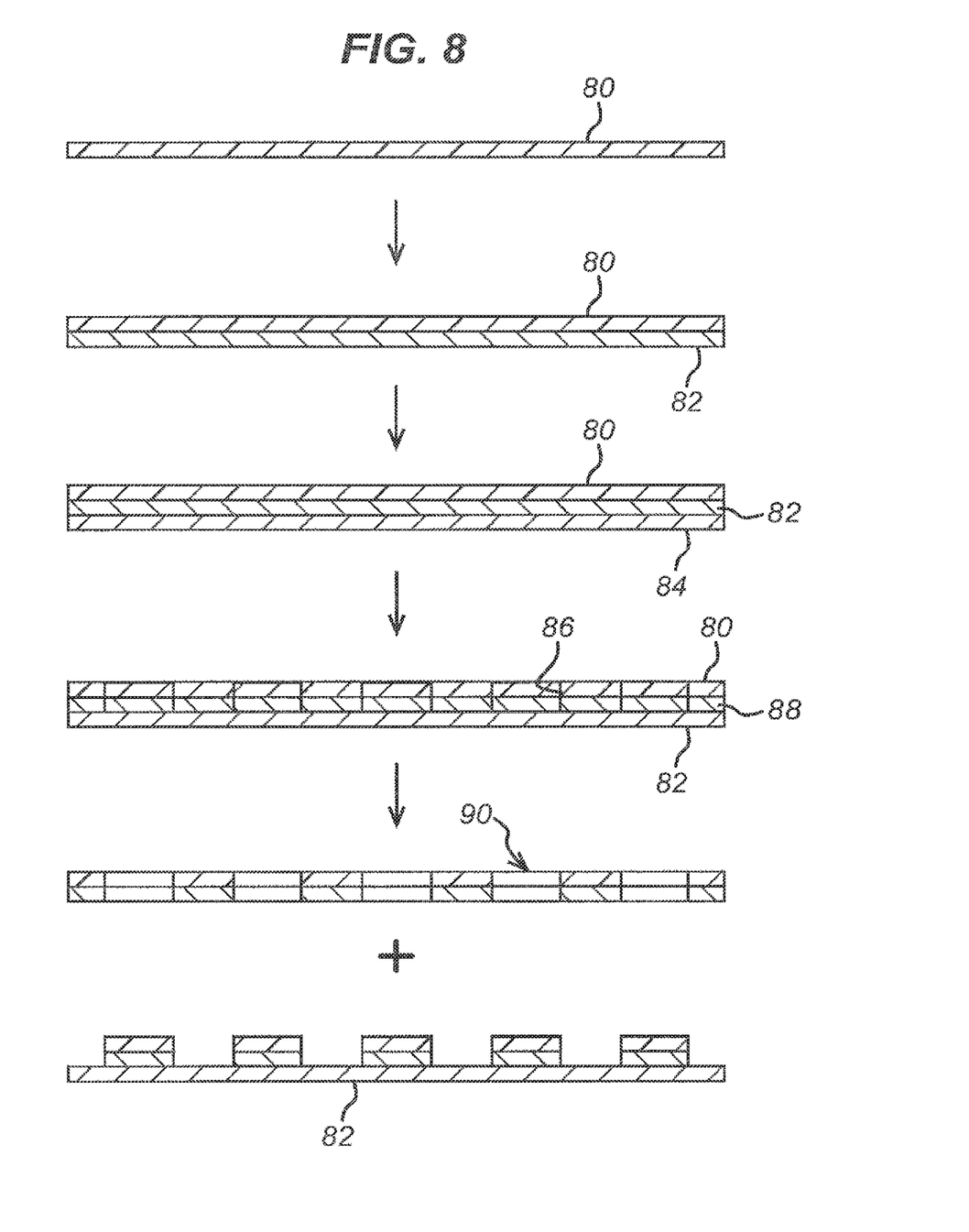
FIG. 8 shows a schematic view of a method according to the invention of making the silicone-coated apertured top sheet.

Referring to FIG. 8, the steps in the preparation of the apertured wound facing sheet according to this embodiment start from a release sheet 80 of a polymeric film material. This is coated with a layer 82 of the fluid silicone precursor composition as described 30 below. The coating may be done by any conventional means such as spraying, roller and/or doctor blade. A layer 84 of the substrate film material is then laminated over the fluid silicone layer. The laminate is then heated to thermally cure the silicone elastomer by passing through an oven held at 150° C. Typical conditions are 5 passes at 4.2 m/min, total residence time 1.5 minutes. This results in thermal partial cure of the silicone coating. The material is then allowed to cool. The resulting cured laminate passes through a die cutter that makes circular cuts 86 through the substrate film material 84 and the cured silicone layer 88, but not through the release sheet 80. The release sheet 5 80 is then peeled from the silicone layer to separate the apertured coated substrate 90 from the release sheet 80. The silicone and support film from the apertures adheres to the release sheet and is removed with the release sheet 80. The silicone coating composition is prepared by mixing Components A and B of a soft silicone skin adhesive silicone elastomer kit supplied by Dow Corning under product reference Q7-9177. The 10 components are mixed in weight ratio 50:50. Component A comprises a bis-dimethylvinyl terminated poly dimethyl siloxane and a platinum catalyst. Component B comprises a bis-hydride terminated polydimethylsiloxane. To the mixture is added 2-methyl-3-butyn-2-ol inhibitor at a concentration of 0.02 wt. %.

Alternatively, and again with reference to FIG. 8, the release sheet 80 of a polymeric film material is coated with a layer 82 of the fluid silicone precursor composition by any conventional means such as spraying, roller and/or doctor blade and the coated film is then heated to thermally cure the silicone elastomer by passing through an oven held at 150° C. Typical conditions are 1 pass at 0.8 m/min, total residence time 1.5 minutes. 20 This results in thermal cure of the silicone coating. Layer 84 of the substrate film material is then laminated over the silicone layer. The material is then allowed to cool. The resulting cured laminate passes through a die cutter that makes circular cuts 86 through the substrate film material 84 and the cured silicone layer 88, but not through the release sheet 80. The release sheet 80 is then peeled from the silicone layer to separate 25 the apertured coated substrate 90 from the release sheet 80. The silicone and support film from the apertures adheres to the release sheet and is removed with the release sheet 80. The silicone coating composition is prepared by mixing Components A and B of a soft silicone skin adhesive silicone elastomer kit supplied by Dow Corning under product reference Q7-9177. The components are mixed in weight ratio 50:50. 30 Component A comprises a bis-dimethylvinyl terminated polydimethylsiloxane and a platinum catalyst. Component B comprises a bis-hydride terminated polydimethylsiloxane.

The above embodiments have been described by way of example only. It is understood that many other embodiments falling within the scope of the accompanying claims will be apparent to the skilled reader. All publications, patents, and patent applications cited herein are hereby incorporated by reference in their entirety for all purposes.

What is claimed is:

1. A method of making a wound dressing, comprising:
    forming a precursor laminate comprising a layer of silicone sandwiched between a polymeric film support sheet and a release sheet;
    die cutting aperture perimeters through the polymeric film support sheet and the silicone layer; and
    removing the release sheet to leave an apertured layer comprising an apertured polymeric film having a coating of a silicone gel on a wound-facing surface of the apertured polymeric film, wherein removing the release sheet further comprises removing a fill formed by die cutting aperture perimeters.

2. The method of claim 1, wherein the silicone is a fluid silicone pre-polymer.

3. The method of claim 2, further comprising curing said fluid silicone pre-polymer.

4. The method of claim 1, wherein said precursor laminate is formed by disposing a layer of a fluid silicone prepolymer on said release sheet, curing said fluid silicone prepolymer, and disposing said polymeric film support sheet on the silicone layer.

5. The method of claim 1, further comprising:
coating a surface of a backing sheet with a layer of pressure-sensitive adhesive; applying an island of absorbent material to a central region of the adhesive-coated surface of the backing sheet, wherein the absorbent material has a smaller area than the backing sheet so as to leave an adhesive-coated margin of the backing sheet around the island; and
applying said apertured layer over said island with said polymeric film support sheet facing the backing sheet, wherein a margin of said apertured layer is adhered to said adhesive-coated margin around said island.

6. The method of claim 1, wherein die cutting aperture perimeters through the polymeric film support sheet and the silicone layer comprises leaving the release sheet free of any cuts.

* * * * *